United States Patent
Mariller

(10) Patent No.: US 9,414,709 B2
(45) Date of Patent: Aug. 16, 2016

(54) DEVICE FOR PREPARING A BEVERAGE EXTRACTED FROM A CAPSULE

(75) Inventor: Alain Mariller, Le Mont-Pèlerin (CH)

(73) Assignee: ETHICAL COFFEE COMPANY SA, Fribourg (CH)

( * ) Notice: Subject to any disclaimer, the term of this patent is extended or adjusted under 35 U.S.C. 154(b) by 646 days.

(21) Appl. No.: 13/386,832

(22) PCT Filed: Jul. 16, 2010

(86) PCT No.: PCT/IB2010/053257
§ 371 (c)(1),
(2), (4) Date: May 3, 2012

(87) PCT Pub. No.: WO2011/010263
PCT Pub. Date: Jan. 27, 2011

(65) Prior Publication Data
US 2012/0210878 A1    Aug. 23, 2012

(30) Foreign Application Priority Data

Jul. 24, 2009 (WO) .............. PCT/IB2009/053220

(51) Int. Cl.
*A47J 31/00* (2006.01)
*A47J 31/36* (2006.01)
*A47J 31/06* (2006.01)
*B65D 85/804* (2006.01)

(52) U.S. Cl.
CPC .......... *A47J 31/3623* (2013.01); *A47J 31/0668* (2013.01); *A47J 31/3676* (2013.01); *B65D 85/8043* (2013.01)

(58) Field of Classification Search
CPC  A47J 31/3623; A47J 31/3628; A47J 31/3676
USPC ................. 99/295, 302 P, 323; 426/77, 78
See application file for complete search history.

(56) References Cited

U.S. PATENT DOCUMENTS

| 5,402,707 A    | 4/1995 | Fond et al.        |        |
| 7,946,217 B2 * | 5/2011 | Favre et al. ..... | 99/295 |
| 8,512,776 B2 * | 8/2013 | Yoakim et al. .... | 426/77 |

(Continued)

FOREIGN PATENT DOCUMENTS

| CN | 1328804    | 1/2002  |
| DE | 7 430 109 U | 3/1976  |
| EP | 0 512 468 A1 | 11/1992 |

(Continued)

OTHER PUBLICATIONS

Chinese Office Action dated May 14, 2014 issued in Chinese Patent Application No. 201080032431.6, 14 pp.

(Continued)

*Primary Examiner* — Reginald L Alexander
(74) *Attorney, Agent, or Firm* — Nixon & Vanderhye P.C.

(57) ABSTRACT

The invention relates to a device for preparing a beverage extracted from a capsule (1) having a sealing bulge (6) in the bottom portion of the sidewall (2) thereof, said device including a capsule mounting (4) and a capsule housing (5), inside of which at least one water inlet and a capsule boring means are arranged, characterized in that the bottom end of the inner surface of said housing (5) comprises an annular recess (8) sized such that at least part of the inner surface thereof provides sealed contact with said sealing bulge (6).

11 Claims, 4 Drawing Sheets

(56) References Cited

U.S. PATENT DOCUMENTS

2001/0052294 A1    12/2001  Schmed
2009/0130270 A1*    5/2009  Cortese .................... 426/281

FOREIGN PATENT DOCUMENTS

| | | |
|---|---|---|
| EP | 1654966 | 5/2006 |
| EP | 1 849 715 A1 | 10/2007 |
| JP | 2008-517839 | 5/2008 |
| JP | 2009-511143 | 3/2009 |
| WO | WO 02/00073 A1 | 1/2002 |
| WO | WO 2006/045537 | 5/2006 |
| WO | WO 2006/111807 | 10/2006 |
| WO | WO 2007/042415 | 4/2007 |
| WO | WO 2007/122208 | 11/2007 |
| WO | WO 2007/137974 | 12/2007 |
| WO | WO 2009/090201 | 7/2009 |

OTHER PUBLICATIONS

Japanese Office Action dated Apr. 30, 2014 issued in Japanese Patent Application No. 2012-521137, 6 pp.
International Search Report for PCT/IB2010/053257 mailed Dec. 11, 2010.
Written Opinion of the International Searching Authority mailed Dec. 11, 2010.
English Translation of International Preliminary Report on Patentability (IPRP) for PCT/IB2010/053257, dated Jul. 16, 2010.
Notice of Opposition to a European Patent re European Patent No. EP 2 456 689 entitled "Device for Preparing a Beverage Extracted from a Capsule" by Nestec S.A., dated Jan. 17, 2014 (6 pages).
Opposition Brief of Nestec S.A. re European Patent No. EP 2 456 689, dated Jan. 17, 2014 (14 pages).

* cited by examiner

DEVICE FOR PREPARING A BEVERAGE EXTRACTED FROM A CAPSULE

This application is the U.S. national phase of International Application No. PCT/IB2010/053257 filed 16 Jul. 2010 which designated the U.S. and claims priority to PCT/IB2009/053220 filed 24 Jul. 2009, the entire contents of each of which are hereby incorporated by reference.

FIELD OF THE INVENTION

The present invention falls within the field of the preparation of drinks or beverages, e.g. those based on coffee, by extracting a concentrated dose, e.g. of ground coffee, contained in a capsule. It relates more specifically to the devices that use such capsules.

PRIOR ART

Capsules and machines that operate on the aforementioned principle have been in existence for several decades.

U.S. Pat. No. 2,899,886, U.S. Pat. No. 2,968,560, U.S. Pat. No. 3,403,617 and U.S. Pat. No. 3,607,297 describe devices in which the capsule is initially pierced at several points, then has pressurized water passed through it.

The capsule described in patent CH 605 293 or in patent EP 0 242 556 B1 comprises a membrane in its lower part. Water under pressure is initially introduced into the upper part of the capsule, causing the capsule to swell, mainly in the region of the membrane. Beyond a certain pressure, the membrane tears thereby allowing a water-coffee mixture to flow out.

Other capsules equipped with membranes are described in the following patent documents: EP 0 468 079 A, EP 0 806 373 A, EP 0 554 469 A.

SUMMARY OF THE INVENTION

The present invention notably seeks to improve the sealing of the devices intended to extract coffee from capsules provided with a sealing bulge in their lower part.

The subject of the invention is, therefore, a device for preparing a drink extracted from a capsule provided with a sealing bulge in the lower part of its side wall, the device comprising a capsule support and a capsule cage inside which there are at least a water inlet and capsule-piercing means, characterized in that the lower end of the internal face of said cage comprises an annular recess sized so that at least part of its internal face comes into sealed contact with said sealing bulge.

Advantageously, sealing can be improved by fixing a seal in the recess.

According to one embodiment of the invention, the seal comprises a moving part the free end of which is designed to come into sealed contact with said sealing bulge.

To support the seal, the recess may further comprise a backing ring, preferably positioned under the seal.

In an alternative form of the invention, the ring comprises at least one hole positioned to allow liquid to flow.

DETAILED DESCRIPTION OF THE INVENTION

The invention is described in greater detail hereinafter via nonlimiting embodiments illustrated by the following figures.

Figure 1:
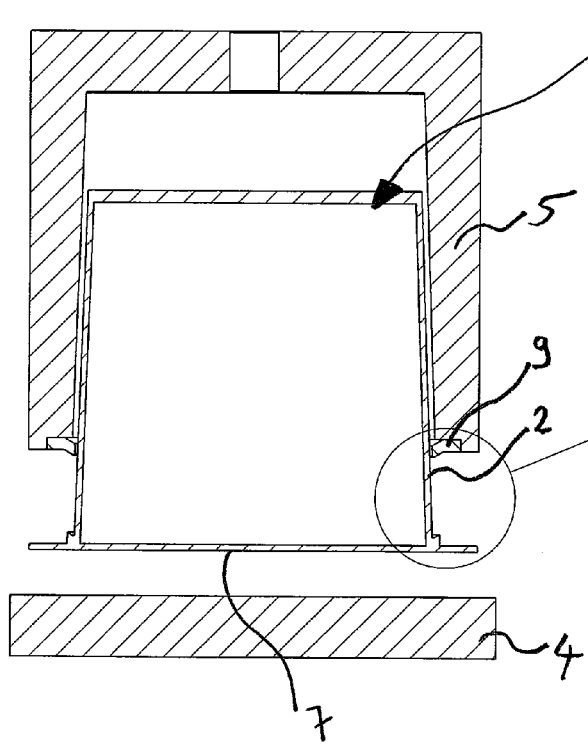
FIGS. 1 to 4 illustrate one embodiment of the invention.

FIG. 1 shows a capsule 1 provided with a lower extraction face 7, which is arranged in an assembly consisting of a capsule support 4 and of a capsule cage 5. The side wall 2 of the capsule 1 in its lower part comprises a sealing bulge 6 in the form of a gutter 10. More specifically, the bulge 6 lies near the intersection of the planes defined by the side wall 2 and the flange 3 of the capsule 1.

Figure 2:
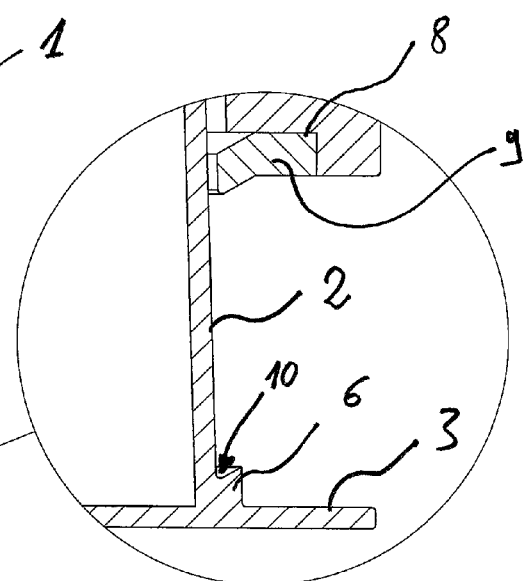

As can also be seen in FIG. 2, the internal face of the wall of the cage 5 has an annular recess 8.

According to one unillustrated embodiment of the invention, the recess 8 has no sealing element. Its internal face is simply configured in such a way as to seal with the bulge 6.

Sealing can be achieved by bringing the horizontal face of the recess 8 exclusively into contact with the upper face of the bulge 6.

It is also possible for the recess 8 to be given a geometry which conforms precisely to the geometry of the bulge 6, in the manner of the geometry of a molded object and the geometry of its mold.

Figure 3:
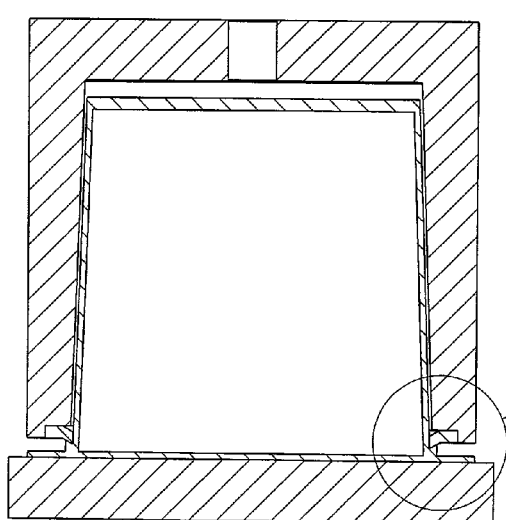
Figure 4:
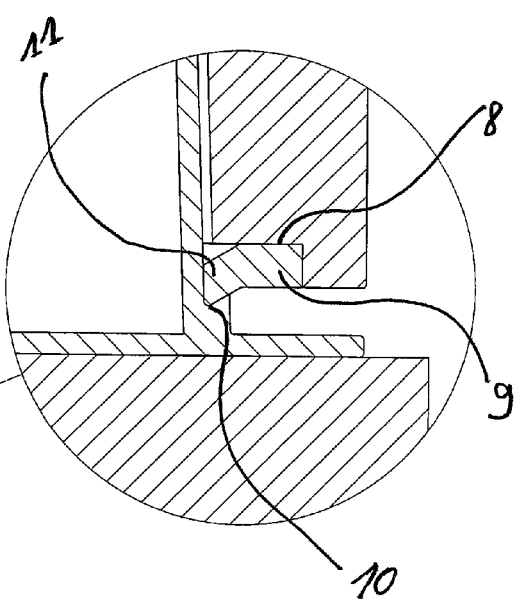
Figure 5:
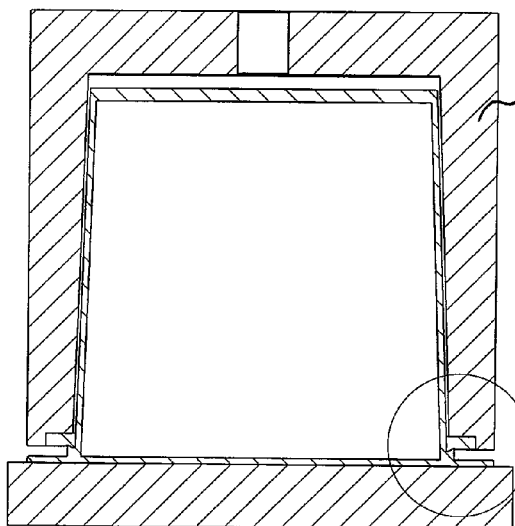
FIGS. 5 to 8 show a comparison between the use of a capsule with a sealing bulge and a capsule without such a bulge.
Figure 6:
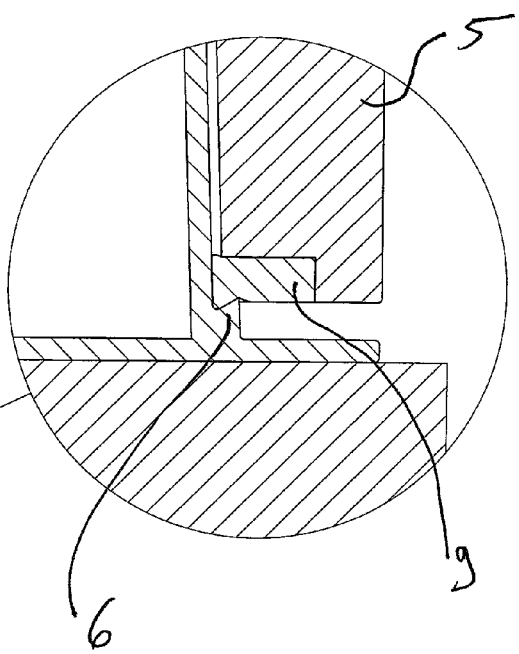
Figure 7:
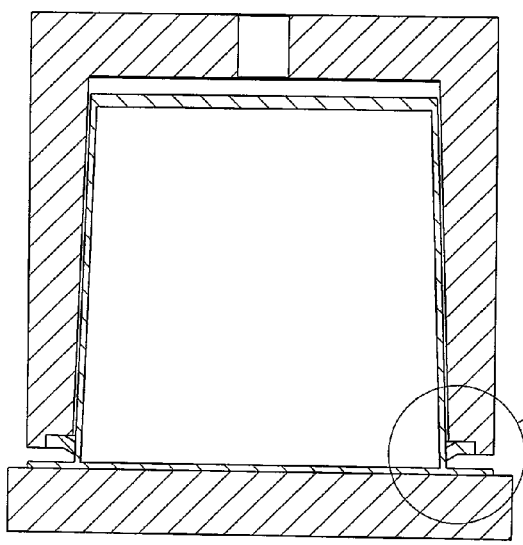
Figure 8:
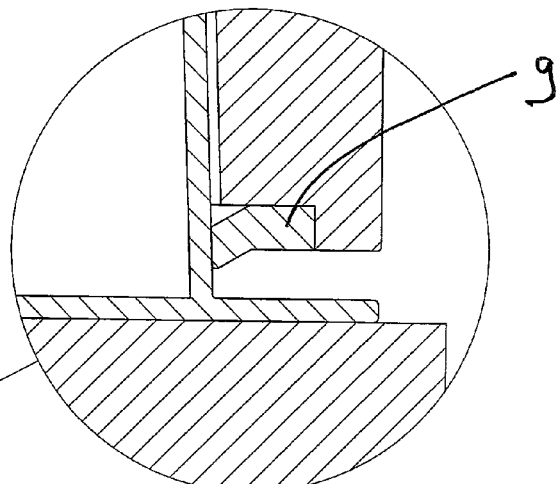
Figure 9:
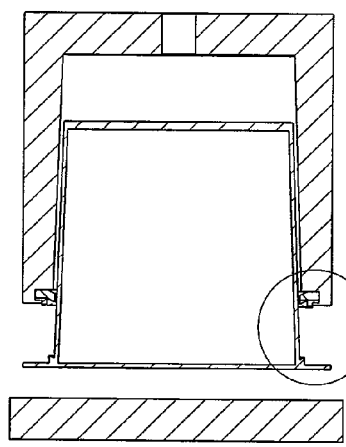
FIGS. 9 to 18 illustrate another alternative form of the invention, in which the seal is supported by a ring.
Figure 10:
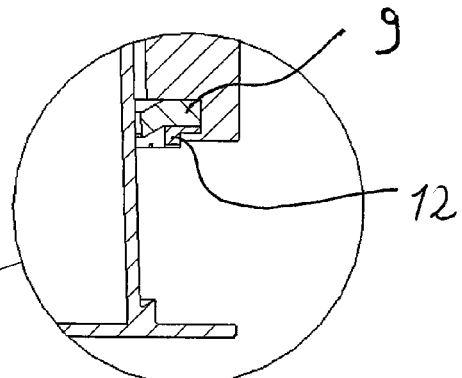
Figure 11:
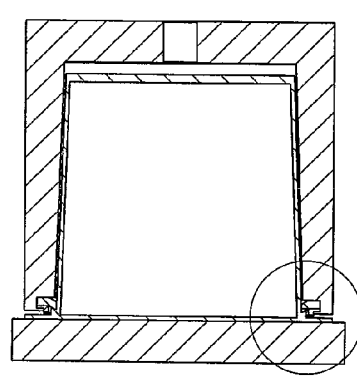
Figure 12:
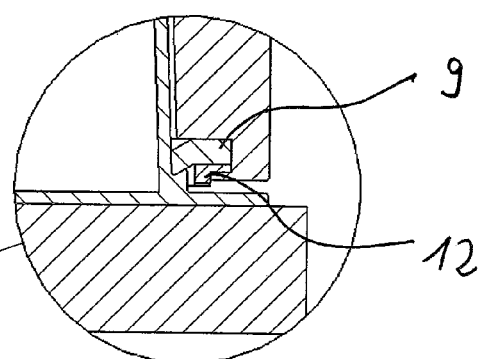
Figure 13:
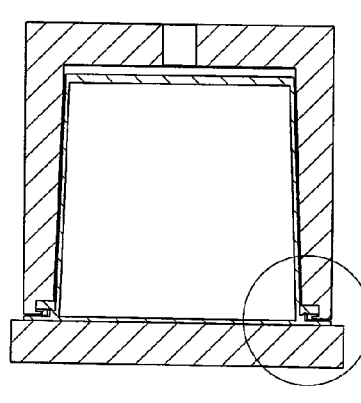

The recess illustrated in FIGS. 1 to 14 comprises a seal 9. The latter comprises a moving part 11 the free end of which is shaped so that it becomes lodged in the gutter 10 of the bulge 6 (see FIGS. 3 and 4 for example).

When liquid flows between the side wall 2 of the capsule 1 and the internal wall of the cage 5, pressure is applied to the upper face of the moving part 11, forcing the latter to become lodged in the gutter 10 of the capsule 1. Sealing at the bulge 6 is thus improved.

If the capsule 1 has no bulge (see FIGS. 7 and 8), the seal 9 does not hold back the liquid. In such a case sealing is not assured.

To improve the effectiveness of the seal 9 in the presence of a capsule 1 provided with a bulge 6, a backing ring 12 may be fitted as illustrated in FIGS. 9 to 18.

Figure 14:
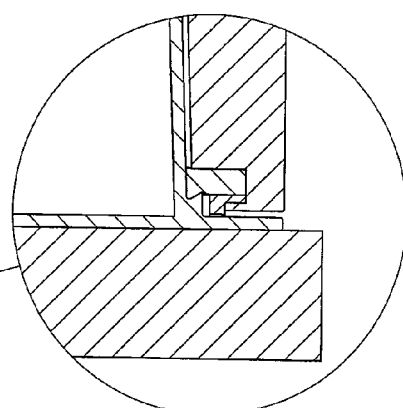
Figure 15:
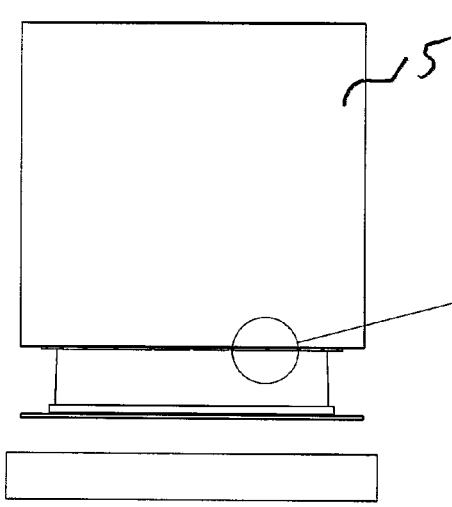
Figure 16:
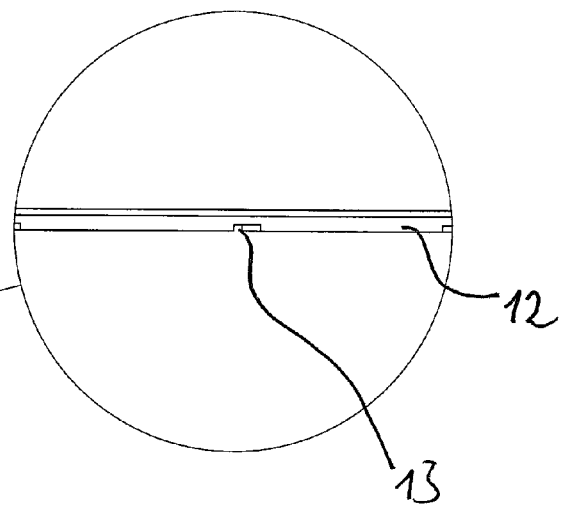
Figure 17:
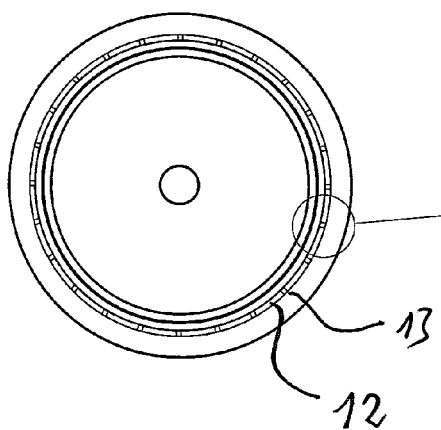
Figure 18:
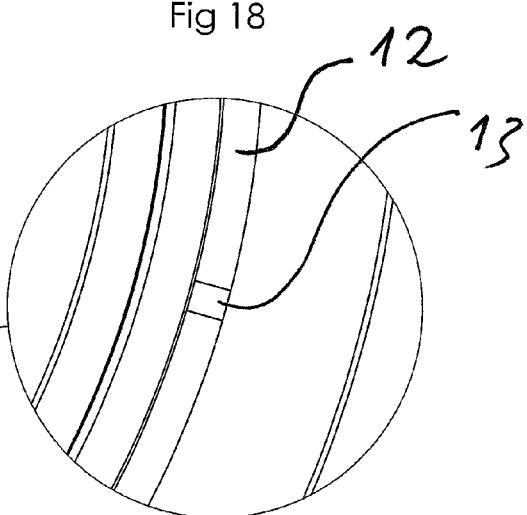

As can be seen particularly in FIG. 14, the ring 12 presses against the flange 3 of the capsule 1, which holds the seal 9 more firmly in the recess 8.

In order to limit the use of the device according to the invention to capsules that have a sealing bulge 6, the ring 12 comprises a series of holes 13. These holes are arranged in such a way as to allow liquid to flow through the ring 13. Thus the ring 12 cannot act like a seal for capsules that do not have a sealing bulge 6.

It goes without saying that the invention is not restricted to the examples illustrated in the figures.

The invention claimed is:

1. A device for preparing a drink extracted from a capsule provided with a side wall, a flange and a sealing bulge in a lower part of the side wall, wherein the device comprises:
    a capsule support, and
    a capsule cage defining an internal face, wherein
    a lower end of the internal face of the capsule cage comprises an annular recess sized so that at least part of the internal face ensures a sealed contact with the sealing bulge, and wherein
    the recess comprises a seal and a backing ring to support the seal, wherein
    the backing ring is positioned in the recess so as to press against the flange of the capsule and thereby hold the seal in the recess.

2. The device as claimed in claim 1, wherein the seal comprises a moving part, and wherein a free end of the moving part is designed to come into sealed contact with said sealing bulge.

3. The device as claimed in claim 1, wherein the backing ring comprises at least one hole positioned to allow liquid to flow therethrough.

4. A device for preparing a drink extracted from a capsule provided with a sealing bulge in a lower part of a side wall, wherein the device comprises:

a capsule support, and a capsule cage, wherein the lower end of an internal face of said cage comprises an annular recess sized so that at least part of the internal face ensures a sealed contact with said sealing bulge, and wherein the recess comprises a seal and a backing ring to support the seal.

5. The device as claimed in claim 4, wherein the seal comprises a moving part, and wherein a free end of the moving part is designed to come into sealed contact with said sealing bulge.

6. The device as claimed in claim 4, wherein said ring comprises at least one hole positioned to allow liquid to flow.

7. A device for preparing a drink extracted from a capsule which includes a side wall, a flange at an end of the side wall, and a sealing bulge in the form of a gutter positioned at an intersection of the side wall and flange, wherein the device comprises:

a capsule support for supporting the flange of the capsule, a capsule cage having a lower end provided with an annular recess at an internal face thereof adjacent the capsule support, and a seal positioned in the annular recess of the capsule cage, wherein the capsule cage is moveable relative to the capsule support between a unsealed position and a sealed position whereby a seal is formed between the seal and the capsule cage, and wherein the seal includes one end fixed to the recess and an opposite end which downwardly projects from the recess and is engageable with the gutter of the capsule, the opposite end of the seal being freely moveable in response to movement of the capsule cage from the unsealed position to the sealed position thereof to cause the opposite end of the seal to be brought into sealing contact with the recess thereby ensuring sealed contact between the capsule cage and gutter.

8. The device according to claim 7, which further comprises a backing ring positioned in the annular recess for supporting the seal.

9. The device according to claim 8, wherein the backing ring is positioned in the annular recess in such a way to press against the flange of the capsule.

10. The device according to claim 9, wherein the backing ring comprises at least one hole to allow liquid to pass therethrough.

11. The device according to claim 8, wherein the backing ring comprises at least one hole to allow liquid to pass therethrough.

\* \* \* \* \*